UNITED STATES PATENT OFFICE 2,591,833

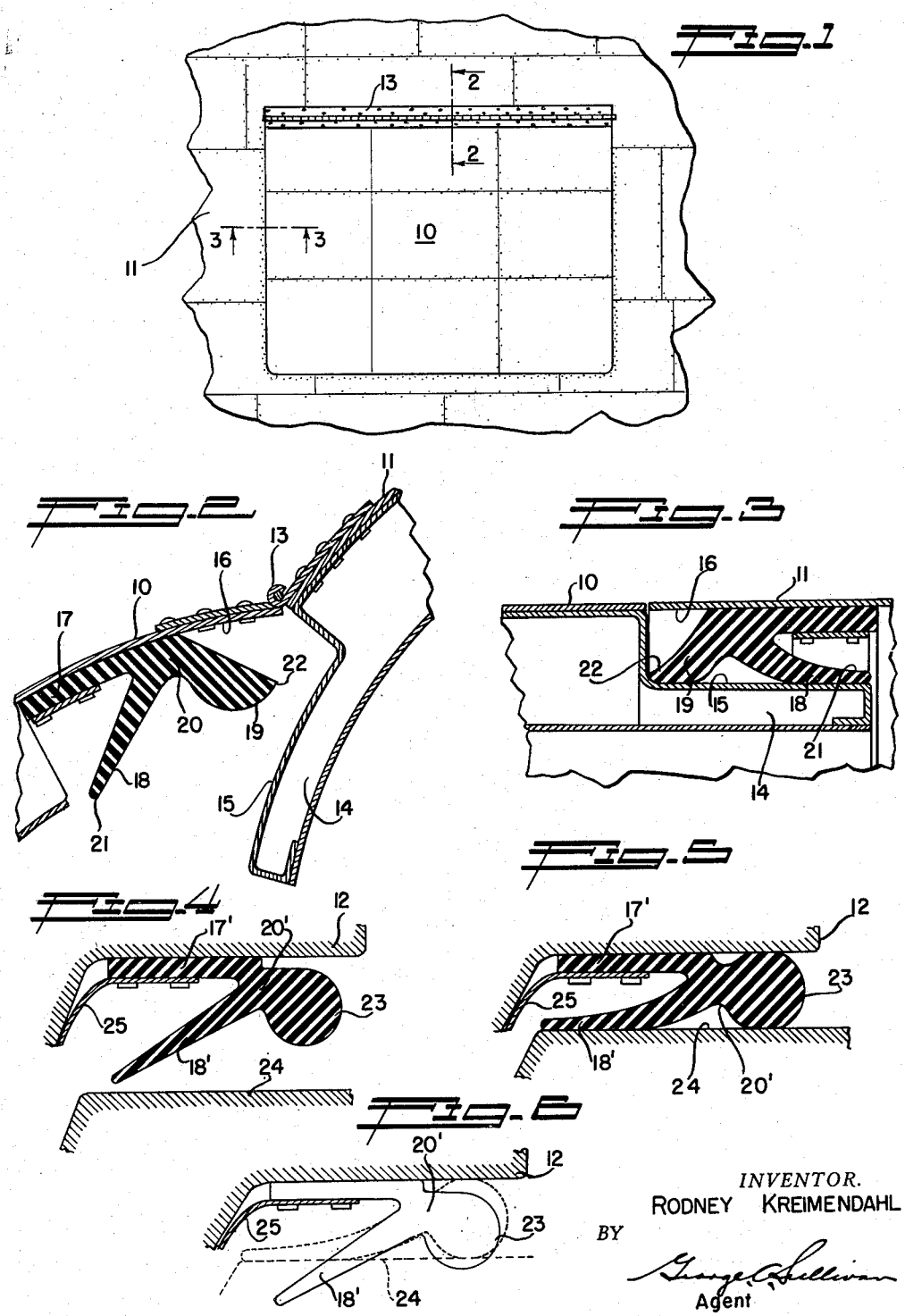

SEAL

Rodney Kreimendahl, North Hollywood, Calif., assignor to Lockheed Aircraft Corporation, Burbank, Calif.

Application September 15, 1948, Serial No. 49,419

2 Claims. (Cl. 20—69)

This invention relates to a sealing strip for closures, particularly of the pressure and fluid sealing types such as weather stripping.

It is an object of this invention to provide an effective weather and pressure tight seal for movable closures, particularly doors of vehicles and airplanes subject to severe service. It is a particular object of this invention to provide a double acting seal operating to seal the margins of a closure against both external and internal leakage of air or other fluids.

I have chosen to illustrate my invention in connection with both airplane closures subject to positive internal pressure differentials, and to refrigerator closures; although my invention is equally applicable to vehicle and other doors subject to frequent use where rain and drafts must be excluded from the enclosure to which the door provides access, as well as preventing loss or entrance of heat, dust, fumes, or the like, from such enclosure.

My invention takes the form of oppositely disposed diverging flexible flaps or beads supported on a common relatively narrow neck parallel to the length of a base or mounting strip, and so arranged that contact between the mating surface of the closure or frame and the flaps or beads serves to increase the pressure of both flaps against such surface due to distortion and tensioning of the material connecting the opposite flaps or beads.

Other objects and advantages of my invention will appear from the following description taken in connection with the accompanying drawings, wherein:

Figure 1 is a fragmentary side elevational view of an airplane fuselage having a cargo door hinged at its top;

Figure 2 is an enlarged detail section on the line 2—2 of Figure 1 showing one form of sealing strip arrangement adjacent the door hinge with the door partly open;

Figure 3 is an enlarged detail section on the line 3—3 of Figure 1 showing the sealing strip applied to the side of the door, with the door closed;

Figure 4 shows an alternative form of seal embodying a bead, with the closure ajar;

Figure 5 corresponds to Figure 4 with the closure sealed; and

Figure 6 illustrates the distortion of the sealing strip of Figure 4 due to seating of the closure.

As shown on the drawing:

The form of sealing strip shown in Figures 2 and 3 is especially useful for airplane doors 10 and the like where it is desired to maintain a positive atmospheric pressure differential within an airplane 11. The alternate form of sealing strip shown in Figures 4 to 6 is equally suitable for such use but is shown as applied to a refrigerator door 12 wherein no differential pressure is encountered. The first form of sealing strip is also usable with refrigerators, but the bead of the second form is preferred for the latter use.

As best shown in Figure 2, the door 10 is hinged at its top by a piano hinge 13, the opening in the airplane having a flanged frame 14 defining a surface 15 substantially evenly spaced from a lip 16 around the edge of the door, the space between the surface 15 and lip 16 being occupied by the sealing strip of this invention, which may be mounted on either the door or its frame as desired, but as shown is mounted on the door lip.

The sealing strip of Figures 2 and 3 comprises an integral one-piece molding or extrusion made from rubber-like elastic material. A flat base strip 17 is provided for attachment to the door or its frame, as desired, which base strip has a pair of oppositely disposed flaps 18 and 19 forming an obtuse angle with each other and joined together and to the base strip by a neck 20.

As used in an airplane, the flap 18 is disposed over and at an acute angle to the base strip forming a horizontal V open to the interior of the airplane so that positive pressure therein tends to open or expand the V to force the free edge 21 of the flap into sealing contact with the mating part of the door and frame structure. This flap is so disposed that its free edge is initially distorted by closure of the door, so that air pressure adds to the sealing effect. With this arrangement a higher internal pressure increases the sealing pressure.

The second, oppositely extending flap 19 has its free edge 22 so disposed as to be initially distorted by contact with the door and/or frame structure, and such distortion applies tension on the other flap 18 to increase its initial pressure against the mating surface. The flap 19 also acts as a weather strip to prevent entrance of external air or water which might lift the flap 18. The flap 19 disposed along the hinge side, as in Figure 2, is subject to some drag or rolling action against the surface 15 as the door is closed, which is prevented by rounding the edge 22. On the free sides of the door a less degree incipient rolling action is involved because the flap 19 spreads as it is compressed.

The modified form of sealing strip shown in

Figures 4 to 6 substitutes a bead 23 for the second flap 19 above described, and the neck 20' supports the bead 23 in spaced relation from the surface of the door 12 on which the base strip is mounted. Since this form is shown in connection with a refrigerator, the door frame thereof is indicated by the reference number 24 and as such refrigerator doors usually have a pan 25 forming the inside surface of the door the edges of the pan may be utilized to clamp the sealing strip base strip 17' to the door, the flap 18' of the seal in turn concealing the edge of the pan.

With this arrangement, closing of the door 12 distorts the flap 18' and compresses the bead between the mating surfaces of the refrigerator and the door, the bead 23 being simultaneously displaced into contact with the door surface. Such displacement of the bead rocks the neck 20' sufficiently to apply additional tension and sealing pressure to the flap 18.

In both illustrated forms of my invention the door is sealed to its frame against both ingress and egress of fluids, thus being capable of retaining a positive internal pressure while sealing against entrance of water and the like, one sealing flap or bead also being arranged to reinforce the other flap to increase the effectiveness of the seal as well as to provide oppositely directed seals expandable by fluid pressure from either direction.

Having thus described my invention and the present preferred embodiments thereof, I desire to emphasize the fact that many modifications may be resorted to in a manner limited only by a just interpretation of the following claims.

I claim as my invention:

1. As an article of manufacture, a double-acting sealing strip comprising a rubber-like member having a base portion for mounting thereof, a first flap integral with an overlying said base portion and extending at an acute angle to said base portion, a second flap integral with and projecting forwardly and laterally from one edge of said base portion at an obtuse angle to said base portion, said flaps being connected to and merging with one another and with said base portion through a flexible neck portion for conjoint action when either flap is deflected from its normal position, the adjacent surfaces of the two flaps being disposed at an obtuse angle to one another and the second flap projecting forwardly of the adjacent surface of the first flap whereby both flaps may contact at spaced points a closure surface parallel to the surface on which the base strip is mounted.

2. A double acting sealing strip to prevent both inward and outward leakage, together with adjacent substantially parallel surfaces of a movable closure and frame, said sealing strip comprising a flat rubber like base strip for mounting on one of the adjacent surfaces, a narrowed neck portion connected to said base strip, a first sealing flap connected to said narrowed neck portion in spaced relation to said movable closure, in such position as to be deformed by contact with the closure when the closure is parallel to the surface on which the base strip is mounted, and a second sealing flap integrally connected to the first sealing flap and said narrowed neck portion, said second sealing flap projecting forwardly of the base strip and overlying the same in diverging spaced relationship thereto in a position to have the free end of said second flap deformed by said closure when the closure is parallel to the frame, said two flaps having conjoint rocking motion relative to the base through the connection therebetween when pressure is applied to either by said closure, and said two flaps being positioned to contact said parallel surface at spaced points.

RODNEY KREIMENDAHL.

REFERENCES CITED

The following references are of record in the file of this patent:

UNITED STATES PATENTS

| Number | Name | Date |
|---|---|---|
| 1,534,498 | Bourgon | Apr. 21, 1925 |
| 1,763,603 | Donahue | June 10, 1930 |
| 2,011,057 | Kraft | Aug. 13, 1935 |